United States Patent [19]

Touchet

[11] 3,990,139

[45] Nov. 9, 1976

[54] VALVE SEAT PULLER

[75] Inventor: Daniel Lee Touchet, Houston, Tex.

[73] Assignee: Daniel Lee Touchet, Crowley, La.

[22] Filed: Jan. 28, 1976

[21] Appl. No.: 653,107

[52] U.S. Cl. .................................................. 29/261
[51] Int. Cl.² .......................................... B23P 19/04
[58] Field of Search ............................... 29/258–266

[56] References Cited

UNITED STATES PATENTS

| | | | |
|---|---|---|---|
| 1,436,081 | 11/1922 | Brockway | 29/259 |
| 1,589,015 | 6/1926 | Lee | 29/261 |
| 2,052,534 | 8/1936 | Quarles | 29/261 |
| 2,650,419 | 9/1953 | Barbisch | 29/266 |

*Primary Examiner*—James L. Jones, Jr.
*Attorney, Agent, or Firm*—Guy E. Matthews

[57] ABSTRACT

In one exemplar embodiment, a valve seat puller is disclosed utilizing a plurality of J-shaped hooks mounted for limited pivotal movement on a hook support block. The hook support block and J-shaped hooks are supported by a threaded rod extending through a central aperture in the support block and secured in place by a lock nut. The J-shaped ends of the hooks are spread to engage the lower rim of the valve seat. The threaded rod passes through an aperture in a pump support plate spaced above the hook support block and is secured to the pump support plate by a drive nut. By applying rotary motion to the rod or the drive nut, the rotary motion will be translated into vertical axial motion of the rod, thus applying a lifting force to the hooks and valve seat to free the seat.

13 Claims, 8 Drawing Figures

FIG. 1
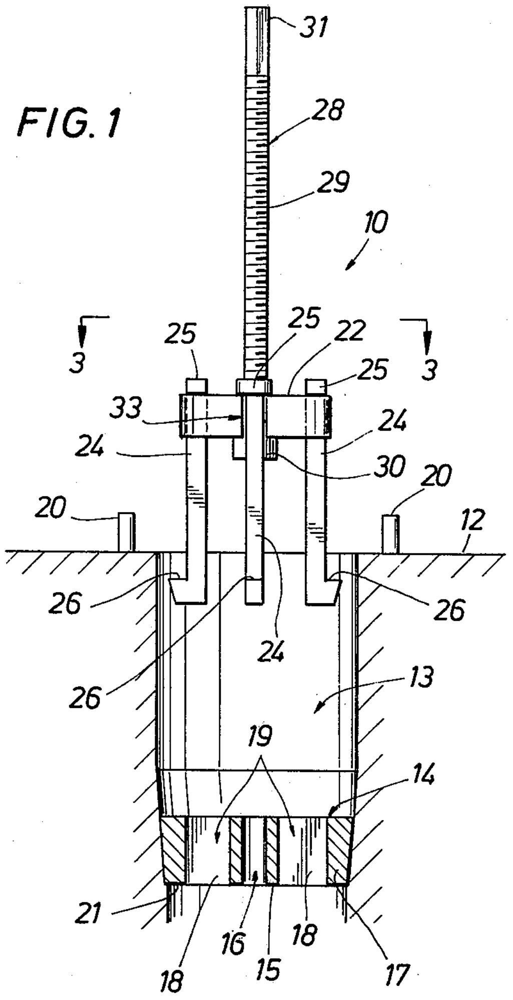
FIG. 2
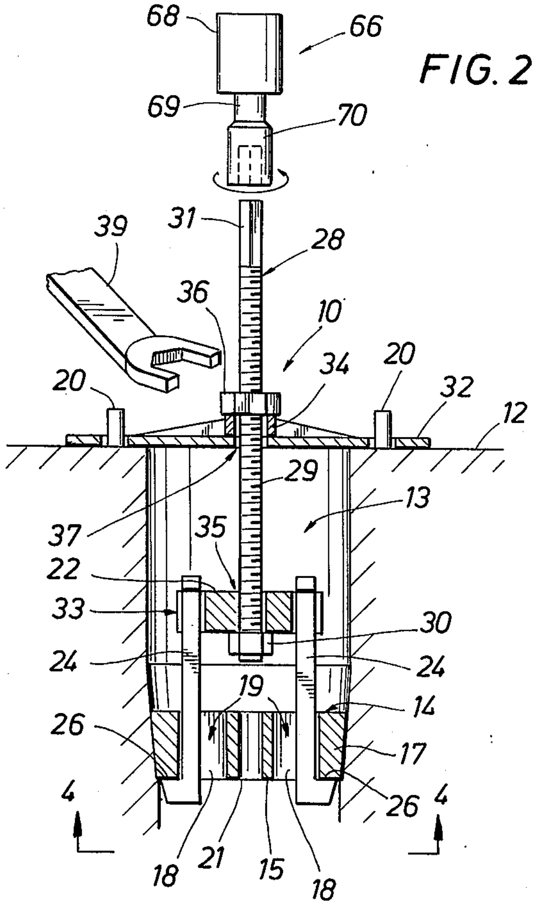
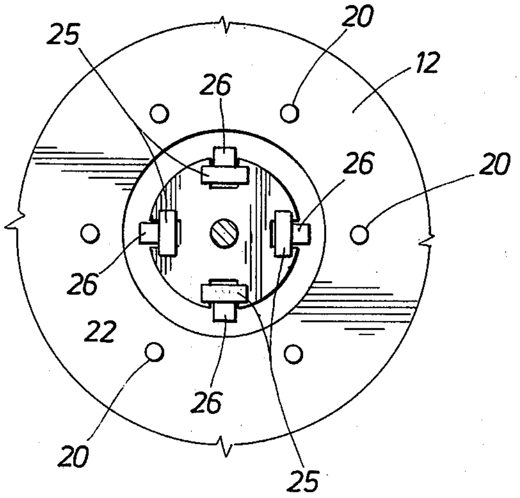
FIG. 3
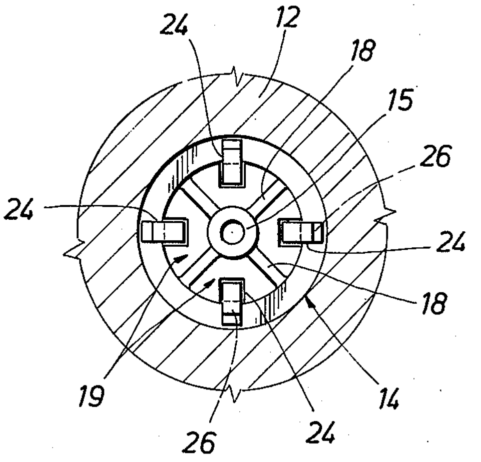
FIG. 4

VALVE SEAT PULLER

BACKGROUND OF THE INVENTION

This invention relates to apparatus for removing valve seats, pump liners and the like. Specifically, the invention deals with a valve seat pulling apparatus to quickly remove such valve seats from pumps such as the type utilized in oil fields.

In the operation of neck pumps, the hammering action on the valve seat, the outside of which is tapered, wedges the valve seat so tightly in the bore of the pump that it is often extremely difficult to remove. There are many prior art devices for pulling pump valve seats and liners, but most of them are complex and expensive. If a valve seat puller is complex, it consumes time in the removal of the valve seat which translates into money lost during the down time. It is not unusual for the down time in removing a valve seat with prior art devices to run 8–20 hours. Using applicant's tool, however, can cut the down time to 2 hours or less.

Accordingly, one primary feature of the present invention is its simplicity and ease of operation.

Another feature of the present invention is that it can be utilized with either a ribbed valve seat or an open valve seat without modification.

SUMMARY OF THE INVENTION

The present invention remedies the problems of the prior art by providing a valve seat puller that can remove stuck valve seats from a pump or the like and provides a plurality of J-shaped hooks having a T-shaped one end, the J-shaped end outwardly engaging the bottom rim of the valve seat. The T-shaped end is supported for limited pivotal movement in radial slots in a hook support plate spaced above the valve seat. A threaded rod passes through an aperture in the center of the hook support plate and a lock nut is threaded on the depending end of the rod to support the hook support plate.

The other end of the threaded rod is vertically extended through a central aperture in a pump support plate adapted for placement over the bore outside the pump housing. A drive nut is threaded over the other end of the bore and contacts the upper surface of the pump support plate to support the weight of the hook support plate and depending hooks. Rotational motion applied to the end of the threaded rod or to the drive nut is translated into vertical axial motion of the rod, thereby applying a lifting force to the hooks and to the valve seat.

In accordance with a further principle of this invention, the valve seat puller also utilizes a frustoconical actuating means or member threaded on the depending end of the threaded rod that can be moved upwardly on the rod to engage the J-shaped hooks for spreading and maintaining the hooks in contact with the valve seat rim. A dual-pitch threaded rod may be used, with coarser pitch threads engaging the drive nut than those engaging the lock nut retaining the hook support plate. The use of dual pitch threads multiplies the lifting force in comparison to the necessary force for applying rotary motion to the rod or drive nut.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope, for the invention may admit to further equally effective embodiments.

In the drawings:

FIG. 1 is a side elevational view (partly in cross-section) of the valve seat pulling apparatus according to the invention being inserted into the valve housing.

FIG. 2 is a side elevational view (partly in cross-section) of the valve seat pulling apparatus according to this invention shown ready to apply lifting force to the pump valve seat.

FIG. 3 is a detailed horizontal cross-sectional view of the valve seat pulling apparatus according to this invention as taken along lines 3—3 of FIG. 1.

FIG. 4 is a detailed horizontal cross-sectional view of the pump locking into the valve seat pulling apparatus engaging the valve as taken along lines 4—4 of FIG. 2.

DETAILED DESCRIPTION OF THE PREFERRED EMBODIMENTS

Figure 5:
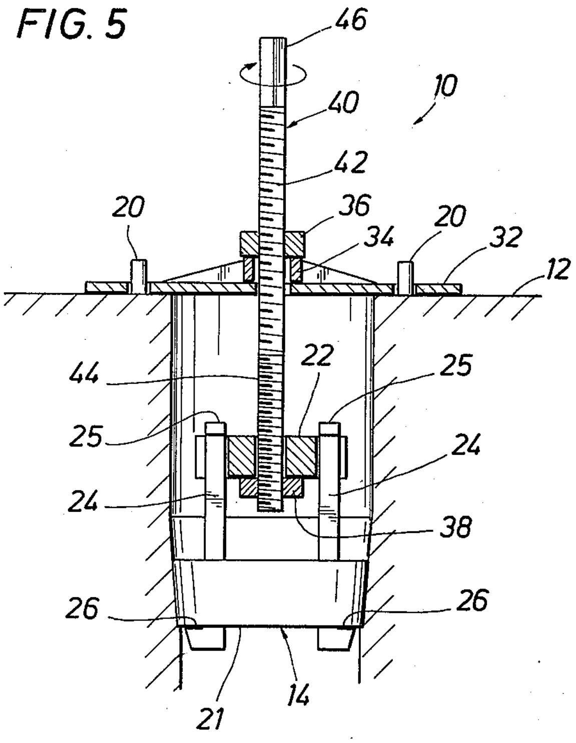
FIG. 5 is a side elevational view (partly in cross-section) of the valve seat pulling apparatus according to this invention and showing a second embodiment of the threaded rod used to apply lifting force to the valve seat.

Referring now to FIGS. 1, 2, 3 and 4, the operation of the valve seat pulling apparatus will be explained in detail. A portion of the valve seat pulling apparatus 10 is shown being inserted into opening 13 of pump 12 for engaging stuck valve seat 14. Valve seat 14 comprises an outer ring 17 having a lower rim 21 and a concentrically spaced inner ring 15 positioned by integral ribs 18. The inner ring 15 has a central aperture 16 therethrough, with spaces 19 between the structural ribs 18. Pipe pulling apparatus 10 comprises a plurality of J-shaped hooks 24 having a J-shaped end or head 26 and a transverse T-shaped other end 25. The hooks 24 are pivotally supported by its T-shaped end 25 in radial slots 33 of support block or plate 22.

One end 29 of threaded rod 28 is insertable through an aperture 35 centrally located through block 22, and has attached thereto a nut 30 for supporting the block 22 and depending J-shaped hooks 24. The hooks 24 and block 22 are lowered into the opening 13 to allow the hooks 24 to pass through the openings 19 between the inner ring 15 and the outer ring 17 of valve seat 14 and permit the J-shaped hook ends 26 to engage the lower rim 21 of the outer ring 17 of the valve seat 14.

Once the J-shaped hooks 24 are engaging the lower rim 21 of valve seat 14, a pump housing support plate 32 is lowered over the threaded rod 28 through a central aperture 37. Support plate 32 may have apertures adjacent its ends for accommodating pump flange bolts 20 to ensure that pump support plate 32 is maintained in a position to hold rod 28 in a vertical position. Concentric with aperture 37 is a raised cylindrical section 34, the upper surface of which provides a bearing surface for a drive nut 36 that is threadably lowered over drive rod 28 and engages cylinder section 34 and supports the weight of the hook support block 22 and depending J-shaped hooks 24.

The upper projecting end 31 of rod 28 has a square or hex-shaped cross-section and forms the drive end of rod 28. A driving means 66, comprised of motor 68, drive shaft 69 and a chuck 70 formed to mate with the drive end 31 of rod 28 maybe employed to rotate rod 28. When chuck 70 engages the drive end 31 of rod 28, and motor 68 is actuated, the rod 31 is rotated in the direction shown by the arrow, turning rod 28 through nut 36, hook support block 22 and lock nut 30. With conventional right-hand turn threads, rod 28, when turned in the direction shown by the arrow, will have its rotary motion translated into upward axial motion by turning through drive nut 36, thus applying a lifting force to hook support block 22, the attached J-shaped hooks 24 and the engaged valve seat 14. Lock nut 30 has left-hand threads such that with the left-hand rotary motion of rod 28 will tend to drive the threaded end 29 of rod 28 through nut 30, thus locking nut 30 and hook support block 22 together to prevent nut 30 from disengaging from the threaded end 29 of rod 28. The lifting force applied by rod 28 to hook support block 22 is applied through the J-shaped hooks 24 to the lower edge 21 of valve seat 14 until the lifting force is greater than the friction and sticking force holding valve seat 14 in place, thus freeing valve seat 14 which then can be lifted upwardly through opening 13 and out of pump 12 for replacement. Of course, other means of rotating rod 28 may be employed.

Another means of applying a lifting force to the rod 28 is by employing a wrench 39 or other means of engaging drive nut 36 and rotating drive nut 36 while rod 28 remains stationary. By rotating drive nut 36 in the direction opposite to the direction above described for rotating rod 28, the rotary motion of drive nut 36 will be translated into upward axial motion of rod 28 through nut 36, thus applying a lifting force to the hook support block 22, the attached J-shaped hooks 24 and the engaged valve seat 14. In some cases, after a lifting force has been applied to valve seat 14 but it refuses to lift free, it has been found very effective to strike the end 31 of rod 28 a sharp blow with a hammer. This sudden force coupled with the applied lifting force will free the valve seat 14 under all conditions.

The hook support block 22 and nut 30 together can constitute a hook support means for supporting the J-shaped hooks and permitting limited pivotal movement of the hooks, while the pump support plate 32 combined with drive nut 36 can form a support plate means removably attachable to the pump and spaced above the hook support means. The threaded rod 28 in combination with drive means 66 constitutes a lifting means engageable with the hook support means and support plate means for applying a lifting force to the hook support means 22, which lifting force is then transmitted through the J-shaped hooks 24 to the lower rim of the valve seat 14.

Referring now to FIG. 5, the valve seat puller 10 is shown utilizing another embodiment of a lifting means that employs a rod 40 having two threaded sections 42 and 44 that contain threads of different pitch. The pump support plate 32, drive nut 36, the hook support plate, and the J-shaped hooks 24 are identical to the components and members hereinabove described with regard to the embodiment disclosed in FIGS. 1–4, with the exception that the lock nut 38 that is different from nut 30 utilized in the first embodiment above described. In this embodiment, the upper threaded portion 42 of rod 40 contains threads having a first selected pitch, while the lower threaded portion 44 of rod 40 contains threads having a second selected pitch, such that the second pitch is a fine pitch in comparison to the first selected pitch.

Accordingly, upon rotation of rod 40 by means of a drive means, not shown in FIG. 5, rotational motion applied to rod 40 will, because of the differences in pitch between threaded sections 42 and 44, multiply the amount of force upwardly exerted against the hook support block 22, thus multiplying the applied force to the J-shaped hooks 24 and the lower portion of rim 21 of valve seat 14 in comparison to the rotational force exerted on rod 28. In this embodiment, less driving force need be applied to rod 40, as compared to the amount of force necessary to be applied in the previous embodiment. Of course, the force may be applied by rotation of drive nut 36 as hereinbefore described.

Figure 8:
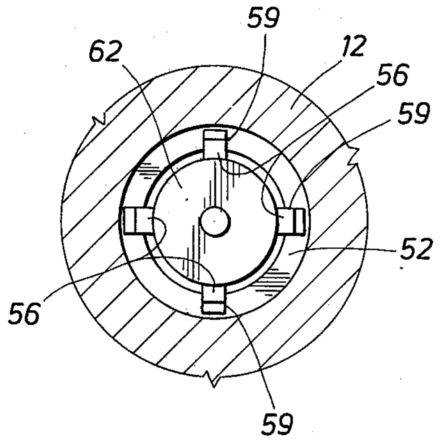
FIG. 8 is a horizontal cross-sectional view of the pump showing the valve seat, and the engaged J-shaped hooks and actuating means engaging the hooks, as taken along lines 8—8 of FIG. 7.
Figure 6:
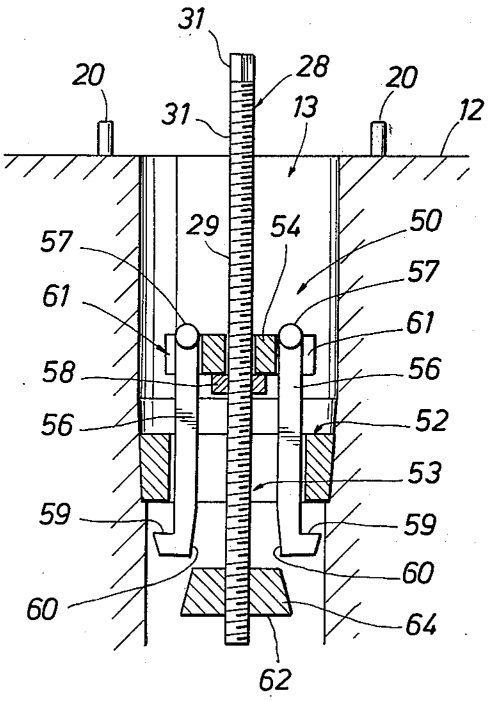
FIG. 6 is a side elevational view (partly in cross-section) of a second embodiment of the valve seat pulling apparatus when inserted into a valve seat and before engagement with the seat.
Figure 7:
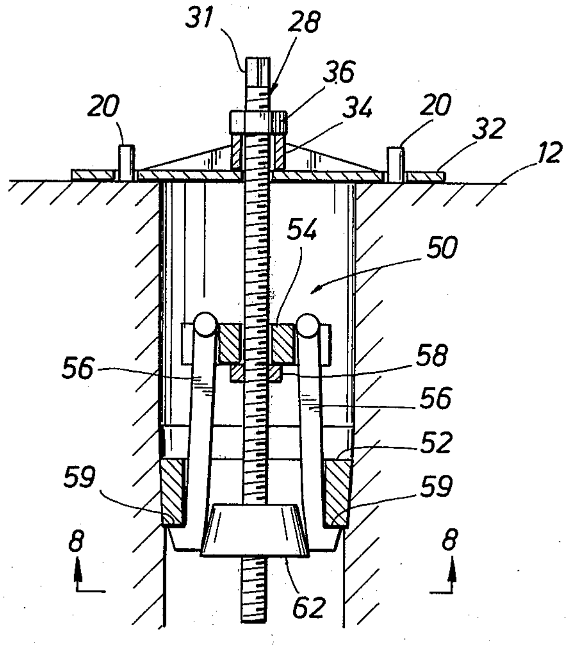
FIG. 7 is a side elevational view (partly in cross-section) of the second embodiment of the valve seat pulling apparatus showing the actuating means engaging the J-shaped hooks for causing engagement with the valve seat in readiness for applying a lifting force to the valve seat.

Turning now to FIGS. 6, 7 and 8, another embodiment of the valve seat puller is shown. In some applications, valve seats 52 are utilized which do not contain the internal ribs 18 as shown in the first embodiment of valve seat 14. Instead, valve seat 52 comprises a solid cylindrical ring having a large aperture 53 threrthrough. The valve seat puller 10 contains a hook support block 54 supporting a plurality of J-shaped hooks 56 in radially spaced slots 61. The J-shaped hooks are supported in slots 61 in support block 54 by a transverse T-shaped head portion 57, with the opposite end having a J-shaped head 59 for engaging the lower rim of valve seat 52. A threaded rod 28 passes through an aperture in said hook support block 54, through the threaded nut 58, and extends below the hook support block 54 to threadably engage an actuating block 62 having an outer frusto-conical surface 64. Actuating block 62 may be moved upwardly so that its outer frusto-conical surface 64 engages the inner surface 60 of the J-shaped hooks 56, thus spreading and maintaining the hooks 56 in engaging contact with valve seat 52.

The pump support plate 32, as previously described in the other embodiments, is utilized, as is a drive nut 36 threadably engaging the threaded rod 28. As hereinbefore described, a drive means 66 may be utilized to engage the hex-shaped end 31 of threaded rod 28 to apply rotary motion to the threaded rod 28. The rotary motion of rod 28 is translated by drive nut 36 into upward axial motion along the axis of rod 28 for applying a lifting force to valve seat 52. The lifting force may be applied by means of rotating drive nut 36 as hereinabove described.

Numerous variations and modifications may obviously be made in the structure herein described without departing from the present invention. Accordingly, it should be clearly understood that the form of the invention herein described and shown in the figures of the accompanying drawings are illustrative only and are not intended to limit the scope of the invention.

What is claimed is:

1. A valve seat puller for removing a rimmed valve seat from a pump or the like, comprising a pluality of equally spaced J-shaped hooks adapted for limited pivotal movement about one end having a T-shaped head, the other ends of which have a J-shaped head adapted for passing through the rimmed valve seat and pivoting outwardly to engage the lower rim surface of the valve seat, a hook support plate spaced above the valve seat and having a plurality of radial slots disposed therein communicating with the periphery of said plate for receiving said J-shaped hooks with said T-shaped end of said J-shaped hooks pivotally engaging the upper surface of said plate, said plate having a central aperture therethrough, an elongaged pump support plate engaging the pump housing and spaced above said circular hook support plate and having a central aperture therethrough, a threaded rod, one end of which projects through said aperture in said circular hook support plate and depends therefrom, the other end of which projects through said aperture of said pump support plate and extends upwardly above said plate, a locking nut threadably attachable to said one end of said threaded rod and engaging the lower surface of said hook support plate for supporting said plate and J-shaped hooks, and drive means cooperating with said threaded rod and pump support plate for supporting said hook support plate and J-shaped hooks in engaging contact with the valve seat and providing upward axial movement of said threaded rod for exerting a lifting force on said J-shaped hooks.

2. The valve seat puller as described in claim 1, wherein said drive means comprises means for engaging said other end of said threaded rod for rotating said rod through said hook support plate and pump support plate, and a drive nut threadably attachable to said other end of said threaded rod and engaging the upper surface of said pump support plate for supporting said hook support plate and J-shaped hooks and translating rotary motion of said threaded rod into upward axial rod motion for exerting a lifting force on said J-shaped hooks.

3. The valve seat puller as described in claim 2, wherein said threads on said threaded rod engaging said drive nut are of a coarser pitch than the threads of said threaded rod engaging said locking nut for multiplying the lifting force exerted on said J-shaped hooks in relation to the driving force applied to said threaded rod.

4. The valve seat puller as described in claim 1, wherein said drive means comprises a drive nut threadably attachable to said other end of said threaded rod and engaging the upper surface of said pump support plate, and nut driving means for engaging and rotating said drive nut and translating rotary motion of said drive nut into upward axial motion of said threaded rod for exerting a lifting force on said J-shaped hooks.

5. The valve seat puller as described in claim 4, wherein said threads on said threaded rod engaging said drive nut are of a coarser pitch than the threads of said threaded rod engaging said locking nut for multiplying the lifting force exerted on said J-shaped hooks in relation to the driving force applied to said drive nut.

6. The valve seat puller as described in claim 1, further including actuating means spaced below said hook support plate and threadably engaging said one end of said threaded rod and adapted for engaging said plurality of J-shaped hooks and pivoting said hooks outwardly into engaging contact with the lower rim surface of the valve seat.

7. The valve seat puller as described in claim 6, wherein said actuating means comprises a frusto-conical member having a central threaded aperture therethrough for threadably engaging said one end of said rod passing through said hook support plate, said frusto-conical member upwardly movable on said rod to permit said member's outwardly and downwardly slanting surface to engage the inner surfaces of said J-shaped hooks for pivoting said hooks outwardly into engagement with the valve seat rim and retaining said hooks in such engaged position while a lifting force is exerted.

8. A valve seat puller for removing a rimmed valve seat from a pump or the like, comprising a plurality of equally spaced J-shaped hooks adapted for limited pivotal movement about one end having a T-shaped head, the other ends of which have a J-shaped head adapted for passage through the rimmed valve seat and pivotable outwardly to engage the lower rim surface of the valve seat, a hook support plate having a plurality of radial slots disposed therein and communicating with the periphery of said plate for receiving said J-shaped hooks, said T-shaped ends of said hooks pivotally engaging the upper surface of said plate, said plate having a central aperture therethrough.

an elongated pump support plate removably attachable to the pump and spaced above said hook support plate and having a central aperture therethrough, a threaded rod, one end of which passes through said hook support plate and projects below said plate, and the other end of which projects through said aperture in said pump support plate and projects above said plate, a first nut threadably attachable to said one end of said threaded rod passing through said hook support plate and engaging the lower surface of said hook support plate for supporting said plate and said J-shaped hooks, a second nut threadably attachable to said other end of said threaded rod and engaging the upper surface of said pump support plate for supporting said hook support plate and J-shaped hooks, and drive means for engaging said other end of said threaded rod for rotating said rod through said hook support plate and said pump support plate, said rotary motion of said rod being translated by said second nut into upward axial rod motion for exerting a lifting force on said hooks in engaging contact with the valve seat.

9. The valve seat puller as described in claim 8, wherein said threads on said threaded rod engaging said second nut are of a coarser pitch than the threads of said threaded rod engaging said first nut for multiplying the lifting force exerted on said J-shaped hooks in relation to the driving force applied to said threaded rod.

10. The valve seat puller as described in claim 8, further including, a frusto-conical actuating member having a central threaded aperture therethrough for threadably engaging said one end of said rod passing through said hook support plate, said actuating member upwardly movable on said rod to permit said member's outwardly and downwardly slanting surface to engage the inner surfaces of said J-shaped hooks for pivoting said hooks outwardly into engagement with the valve seat rim and retaining said hooks in such engaged position while a lifting force is exerted.

11. A valve seat puller for removing a rimmed valve seat from a pump or the like, comprising a plurality of equally spaced J-shaped hooks adapted for limited pivotal movement about one end having a T-shaped head, the other ends of which have a J-shaped head adapted for passage through the rimmed valve seat and pivotable outwardly to engage the lower rim surface of the valve seat, a hook support plate having a plurality of radial slots disposed therein and communicating with the periphery of said plate for receiving said J-shaped hooks, said T-shaped ends of said hooks pivotally engaging the upper surface of said plate, said plate having a central aperture therethrough, an elongated pump support plate removably attachable to the pump and spaced above said hook support plate and having a central aperture therethrough, a threaded rod, one end of which passes through said hook support plate and projects below said plate, and the other end of which projects through said aperture in said pump support plate and projects above said plate, a first nut threadably atachable to said one end of said threaded rod passing through said hook support plate and engaging the lower surface of said hook support plate for supporting said plate and said J-shaped hooks, a second nut threadably attachable to said other end of said threaded rod and engaging the upper surface of said pump support plate for supporting said hook support plate and J-shaped hooks, and drive means for engaging and rotating said second nut about said threaded rod and translating said rotary motion of said nut.

12. The valve seat puller as described in claim 11, wherein said threads on said threaded rod engaging said second nut are of a coarser pitch than the threads of said threaded rod engaging said first nut for multiplying the lifting force exerted on said J-shaped hooks in relation to the driving force applied to said drive nut.

13. The valve seat puller as described in claim 11, further including a frusto-conical actuating member having a central threaded aperture therethrough for threadably engaging said one end of said rod passing through said hook support plate, said actuating member upwardly movable on said rod to permit said member's outwardly and downwardly slanting surface to engage the inner surfaces of said J-shaped hooks for pivoting said hooks outwardly into engagement with the valve seat rim and retaining said hooks in such engaged position while a lifting force is exerted.

* * * * *